Sept. 24, 1963  D. E. STEER  3,104,676
REVERSE CORE CHECK VALVE
Filed Aug. 14, 1958  3 Sheets-Sheet 1

INVENTOR
DONALD E. STEER
BY
*Kenyon & Kenyon*
ATTORNEYS

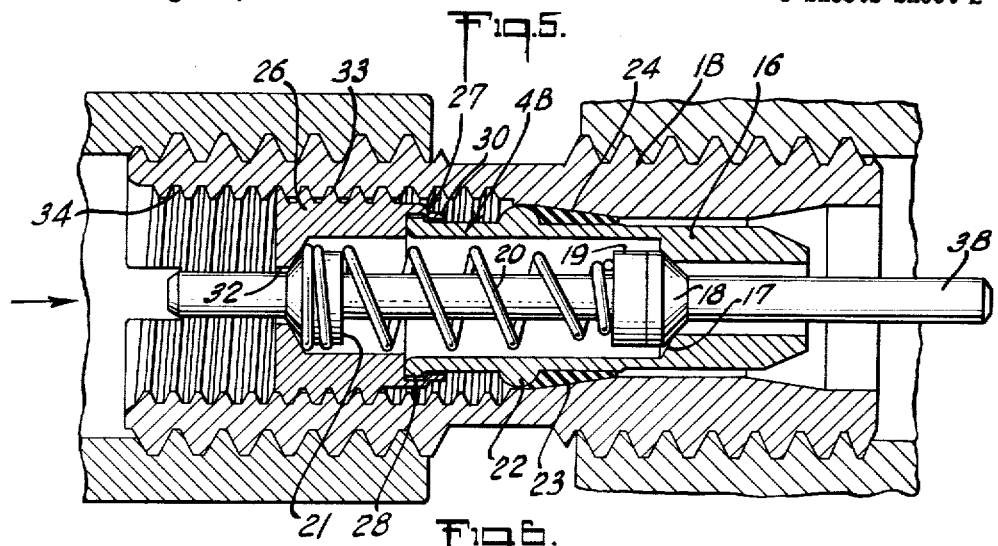
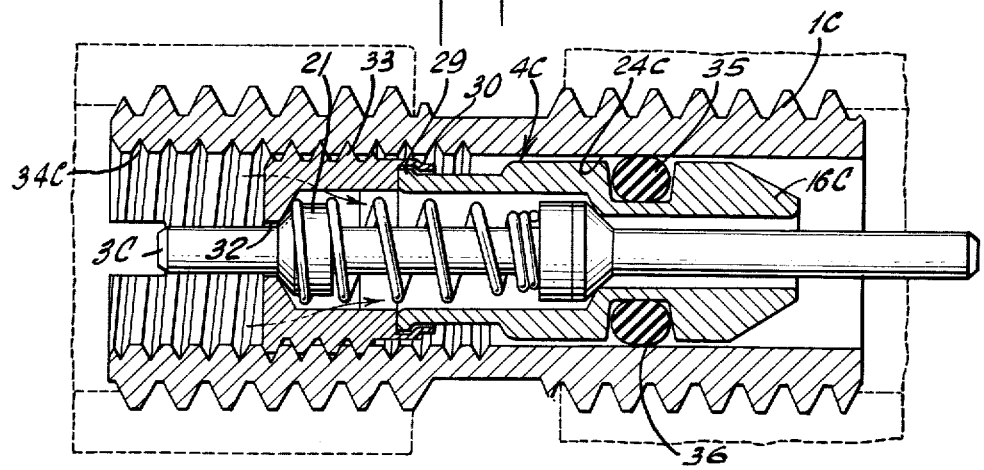
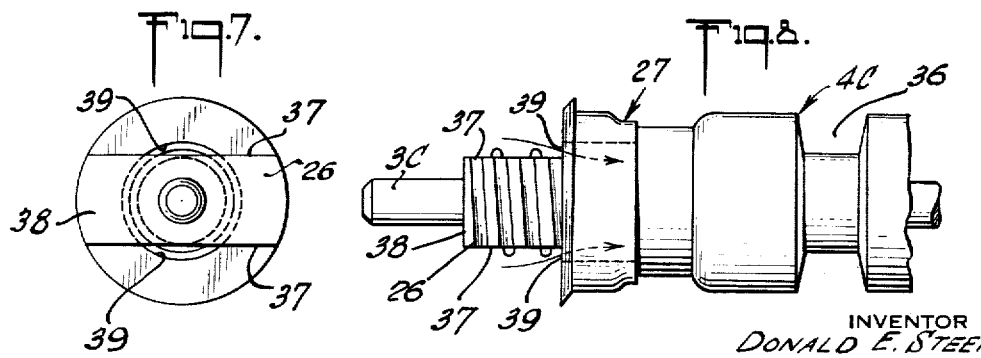

Sept. 24, 1963  D. E. STEER  3,104,676
REVERSE CORE CHECK VALVE
Filed Aug. 14, 1958  3 Sheets-Sheet 3
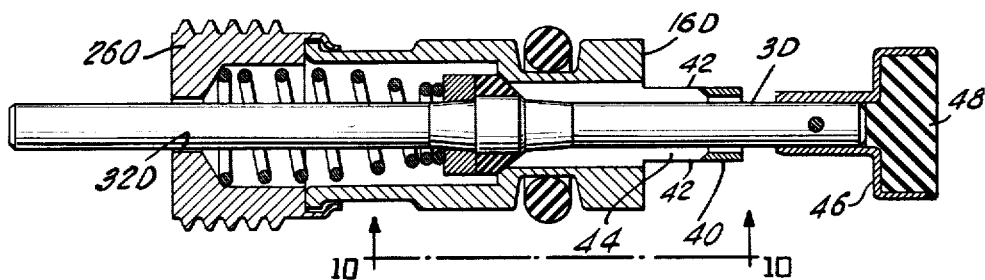
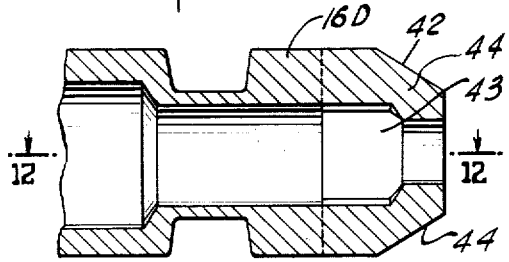
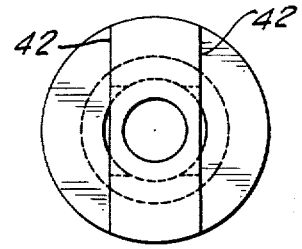
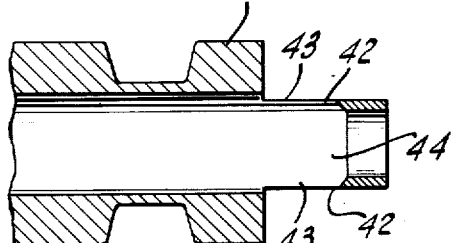
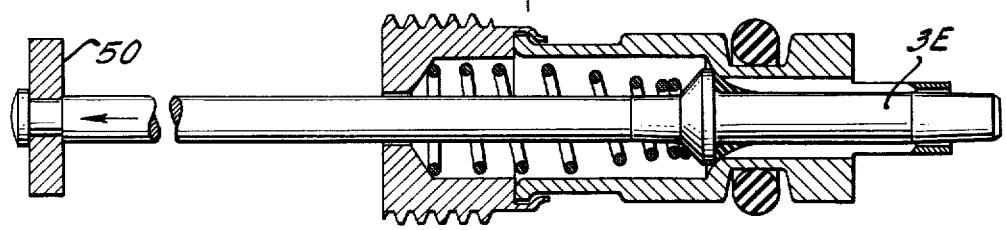
INVENTOR
DONALD E. STEER
BY
*Tennyon & Tennyon*
ATTORNEYS

United States Patent Office 3,104,676
Patented Sept. 24, 1963

---

3,104,676
REVERSE CORE CHECK VALVE
Donald E. Steer, Stratford, Conn., assignor to National Distillers and Chemical Corporation, a corporation of Virginia
Filed Aug. 14, 1958, Ser. No. 754,991
4 Claims. (Cl. 137—234.5)

This invention relates to improvements in pneumatic check valves of the tire valve type and has been developed for the purpose of providing a check valve which can be readily mounted in housings of various types and which can be actuated by various operating devices.

It is one of the primary objects of the invention to provide a valve of this type, herein referred to as a reverse core valve, which can be readily inserted from the outside of a housing, by means of an attachment plug on the rearward end of the valve core.

It is a further object of the invention to provide a device of the type referred to which can be accurately adjusted in a housing to adapt it for various types of operation, without disturbing the seal between the valve core and the housing.

The invention is adaptable to use in various locations for example as a simple check valve or as a pressure release valve or for controlling the passage of air into or from a chamber or operating mechanism, that is, it can be used for controlling the passage of fluid from any source to any connected equipment or container.

The above and other objects will appear more fully from the following description when considered in connection with the drawings wherein:

FIG. 5 is a longitudinal sectional view through a modified form of housing showing another form of the valve core.

FIG. 6 is a longitudinal sectional view similar to FIG. 5 showing a modified form of sealing element between the valve core and housing.

FIG. 7 is an elevational view of the valve core shown in FIG. 6, as viewed from the rearward end.

FIG. 8 is a fragmentary elevational view of the rearward portion of the valve core, shown in FIGS. 6 and 7.

FIG. 9 is a longitudinal sectional view illustrating a further modification of the valve core, with special guide and operating pad.

FIG. 10 is a horizontal fragmentary sectional view of the end of the valve core barrel shown in FIG. 9.

FIG. 11 is an elevational view of the forward end of the barrel shown in FIG. 10.

FIG. 12 is a longitudinal sectional view taken on the line 12—12 of FIG. 10.

FIG. 13 shows a modified form of reverse core valve, illustrating a rearwardly projecting operating disk for the valve.

For convenience in this description the valve will be considered on the basis of a typical tire valve, in which the normal operating end of the pin and the discharge end from the valve are treated as the forward end of the check valve core. The compression spring, maintaining the valve normally closed, accordingly operates toward the forward end of the valve core.

Figure 1:
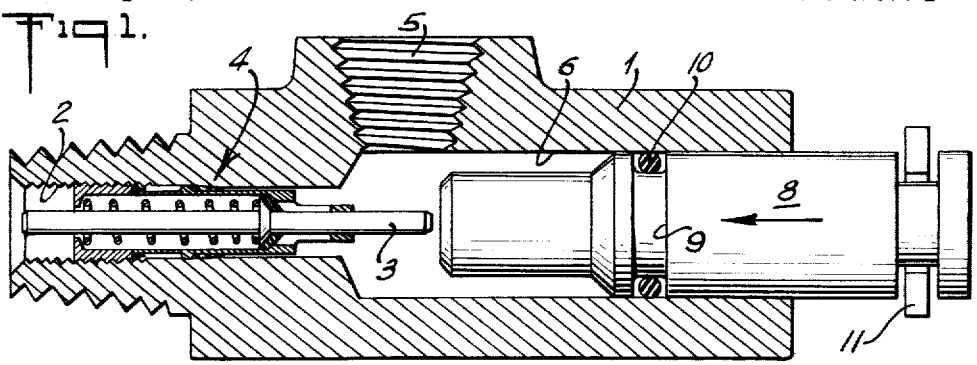
FIG. 1 is a longitudinal sectional view through one type of housing with valve core and operator.

Referring now to FIG. 1 there is illustrated a housing 1 formed with an inlet opening 2 for receiving the check valve core, indicated generally at 4, provided with a center pin 3 through which the valve is actuated. The housing is provided with a side opening 5 leading to the mechanism or reservoir to be supplied with the fluid pressure admitted through the valve core 4 and with an opening 6 in which a suitable operating member may be mounted. The valve core may be any one of the forms described in detail below and shown in the various figures of the drawing and which has a suitable extension on the forward end of the center pin, to be contacted by the operating member.

Figure 2:
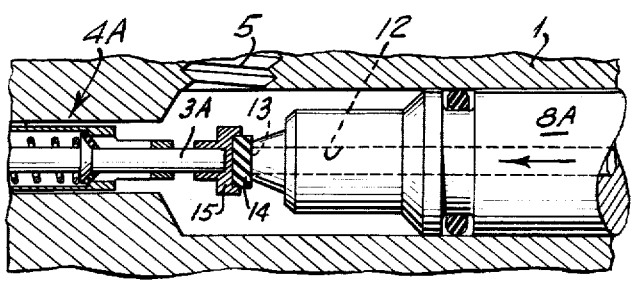
FIG. 2 is a similar view with a modified form of valve core and operator.
Figure 3:
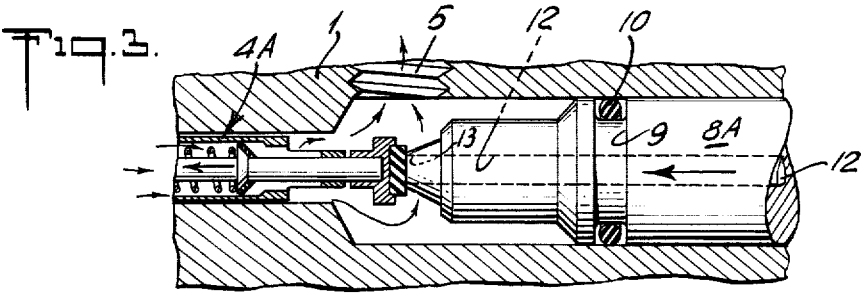
FIGS. 3 and 4 are sectional views of the devices shown in FIG. 2 showing the control device or operator moved to position to open the check valve and to expose the exhaust opening, respectively.
Figure 4:
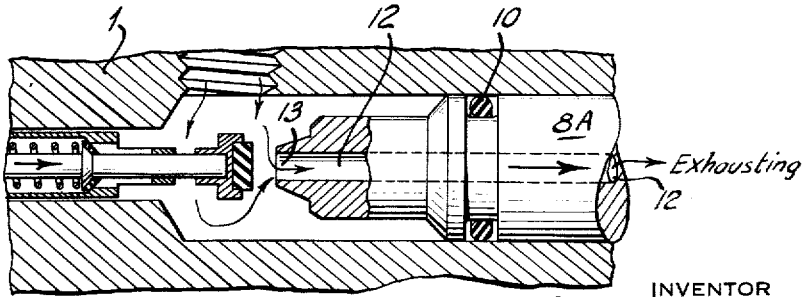

In FIG. 1 the check valve is shown as controlled by an operating plunger 8, slidably mounted in the housing and movable to or from position to engage the center pin 3 to open the valve 4 and maintain it in open position. As shown the operator 8 is provided with an exterior groove 9 in which is placed an O-ring 10 constituting a seal preventing escape of fluid pressure through the space between the operator and the housing. The operator may be under the control of any manual or automatic lever or other device indicated at 11. It will be understood that other types of operator and sealing devices may be employed in place of the plunger 8.

Where it is desired to control not only the admission of fluid through the check valve into the reservoir or device, connected, for example, at the opening 5, but also to permit the escape of pressure from the reservoir, the operator 8A, illustrated in FIGS. 2–4, may be employed. The plunger 8A in this case is shown as formed with a central opening or passage 12 leading from the apertured end 13 thereof to a point beyond the plunger, normally leading to the outside air. In this case the center pin 3A in the valve core 4A is preferably formed with a gasket 14, mounted in a cup 15 as shown in FIG. 2.

In this form of the invention the operator or plunger 8A can be maintained in contact with the gasket 14 on the forward end of the center pin 3A of the valve core 4A, as shown in FIG. 2. With this setting there is no transfer of fluid to or from the housing. Further movement of the plunger rearwardly or to the left, as shown in FIG. 3, opens the check valve, permitting fluid pressure to pass from the source through the check valve to the reservoir or device connected to the housing, for example, at 5. When the plunger 8A is moved to the right the check valve is first permitted to move to closed position, under the influence of its actuating spring, to the position shown in FIG. 3, in which no passage of fluid occurs. Further movement of the plunger 8A to the right, to the position shown in FIG. 4, permits exhaust of the fluid returning to the housing through the connection 5.

Details of one form of housing and valve core adaptable to the present invention are shown in FIG. 5. The valve core 4B includes a main body or barrel 16 having a central longitudinal passage for receiving the center pin 3B. The barrel is formed with a conical sealing surface 17 to be contacted by a corespondingly shaped sealing gasket 18 on the center pin. The gasket 18 is supported by washer 19, the latter also serving as the abutment for the valve spring 20. The pin is tensioned to the right (FIG. 5), that is, toward the forward end of the valve, by a compressed coil spring 20 engaging the washer 19 at its forward end and coiled around a second washer 21 loosely mounted on the center pin 3B at its rearward end. The barrel is formed with an exterior circular bead 22 for suporting the sealing gasket 23 which extends around the central portion of the barrel and which is effective to seal the space between the barrel and the outer support or housing 1B. To this end the interior of the housing is provided with a conical or tapered surface 24 having a reduced diameter at its forward end, corresponding generally to the exterior conical surface of the gasket 23. When the barrel is moved forwardly, by means described below, the gasket 23 is compressed against the sealing surface 24, thus sealing off the space between the barrel and housing.

An attachment plug 26 is connected to the rearward end of the barrel 16 by means of a swivel joint 27, serving to anchor the barrel to the plug, but permitting independent rotation of the plug with respect to the barrel. This is accomplished by forming an outwardly projecting rim or flange 28 on the rearward end of the barrel 16, proportioned to be received within a cylindrical extension 30 formed on the forward end of the plug 26. In assembling the barrel 16 and plug 26 the extension 30 is passed over the flange 28 and bent inwardly behind the flange to anchor the plug to the barrel while forming a swivel joint between the plug and the barrel. In this way there is provided a reverse valve core which can be inserted and adjusted from the rearward end of the housing, the screw adjustment of the plug providing straight line movement of the valve core for bringing the gasket 23 into firm engagement with the sealing surface 24.

The plug 26 serves an additional function of guiding the rearward end of the center pin. It is thus formed with a central opening 32, aligned with the axis of the valve core, loosely receiving the rearward end of the center pin 3B. The exterior screw threads 33 on the plug corespond to the screw threads 34 on the interior of the housing 1B to provide the necessary movement of barrel 4B so that gasket 23 engages sealing surface 24

In FIG. 6 the valve core 4C is shown as adjustable for a substantial distance, dependent on the length of the cylindrical sealing surface 24C, formed on the interior of housing 1C and contacted by the O-ring 35. The uncompressed O-ring, mounted in an external groove 36 in the barrel 16C, is of greater thickness than the space between the bottom of the groove and the sealing surface 24C so that when the valve core is assembled in the housing the O-ring is under compression and the space between the valve core and housing is effectively sealed in all adjusted positions of the valve core. The screw threads 34C on the interior of housing 1C are of an appropriate length to correspond to the length of the sealing surface 24C to acccommodate the required adjustments of the valve core.

In all of the forms of the invention it will be understood that a construction is employed which will permit ready adjustment of the plug in the housing by a suitable tool. This may be accomplished by providing a series of holes or an out-of-round projection on the rearward end of the plug, but it is preferred to employ the construction shown in FIGS. 7 and 8. Thus the diameterically opposite sides of the plug 26 are cut away at 37 leaving a central projecting rib 38 over which a yoke of the usual type used for pneumatic valves can be placed for rotating and adjusting the plug to its desired location within the housing. The removed material, in forming the projecting rib 38, forms side openings, 39, leading to the interior of the plug (and valve core), forming passages for fluids passing through the valve core. The guide opening 32 may thus be reduced to form a smug fit for the center pin. It will be understood that the construction shown in FIGS. 7 and 8 will preferably be empolyed for the plugs shown in the various assemblies disclosed.

Since these valves will generally be used in industrial installations, or at least in locations where long life and uniform operation are necessary, it is desirable to provide a construction in which the center pin is firmly held in place and guided throughout its intended movements. Thus in the valve core shown in FIGS. 5 and 6 the spring, providing the bias for the center pin is coiled about the pin in the usual manner and engages the washer 19. The washer 19 may be pressed onto the center pin 3B or 3C and the assembly placed in a mold where the gasket is molded and bonded to the metal parts. At the other end the spring is coiled about a loosely mounted washer 21 on the center pin. The coil may be merely guided by the washer or if preferred it may be tightly secured thereto by the pressure of the spring. With this construction the spring is not likely to be distorted during rotation of the plug.

In the construction shown in FIG. 9 the center pin 3D is supported at its rearward end by the central opening 32D in the plug 26D. At its forward end it is supported in a ring 40 formed as an extension on the barrel 16D. The barrel is preferably cast and the opposed faces machined away, as shown at 42 in FIGS. 10–12, providing fluid passages 43 and forming in effect a skeleton structure comprising the two side arms 44 supporting the ring 40. Since the valve must be operable by slight pressure the fit of the pin through its guide openings should be snug but not tight. The openings 43 permit the passage of fluid to or from the valve core.

With further reference to FIG. 9 where the forward end of the pin to be used as a seal to prevent the passage of fluid, for example, through an operator as shown in FIG. 2, this pad may be readily attached to the center pin by means of a stamped metal cup 46 secured to the forward end of the center pin and having an outwardly opening dished face for receiveing the rubber or other sealing element 48.

The construction herein disclosed is capable of use in various assemblies. Thus in FIG. 13 there is shown a rearward extension on center pin 3E with a rigid washer 50 secured thereto. This washer may be used to open or close a passage simultaneously with the opening of the check valve or it may be positioned to close or open a suitable passage when the check valve is moved to completely open position or it may be used as a handle for pulling the valve open. The type valve core disclosed, with adjustable positioning plug, combined with the fixed guides of the forward and rearward end of the center pin make this construction particularly adaptable to various types of valve control mechanism.

What is claimed is:

1. A valve core adapted to be mounted in a housing, said core comprising a hollow barrel formed with an interior circular seat, an attachment plug formed with an external screw thread, said plug being attached to the rearward end of said barrel by means of a swivel joint, a spring pressed center pin mounted in said barrel for sliding movement therein, said pin being formed with a forwardly projecting operating end and with a sealing element intermediate its length engageable with said interior seat under the influence of said spring and with a guiding extension on said barrel, surrounding and guiding the forwardly projecting end of said pin, said guiding extension being attached to said barrel by means of a skeleton construction, permitting passage of fluid from the interior of said barrel to a point beyond said guide without passing through said guide.

2. A valve core adapted to be mounted in a housing, said core comprising a hollow barrel formed with an interior circular seat, an attachment plug formed with an external screw thread, said plug being attached to the rearward end of said barrel by means of a swivel joint, a spring pressed center pin mounted in said barrel for sliding movement therein, said pin being formed with a forwardly projecting operating end and with a sealing element intermediate its length engageable with said interior seat under the influence of said spring, means mounted on the rearward end of said barrel for supporting and guiding the rearward end of said pin, the forward end of said barrel being formed with a reduced extension provided with a central opening for receiving and guiding the forward end of said pin, the forward extension on said barrel being cut away to provide openings for the passage of fluids from the interior of said barrel to the space adjacent the forward extension on said pin without passing through said central opening.

3. A valve core adapted to be mounted in a housing, said core comprising a hollow barrel formed with an interior circular seat, an attachment plug formed with an external screw thread, said plug being attached to the rearward end of said barrel by means of a swivel joint, a spring pressed center pin mounted in said barrel for sliding movement therein, said pin being formed with a forwardly projecting operating end and with a sealing element intermediate its length engageable with said interior seat under the influence of said spring, a guiding extension on said barrel, surrounding and guiding the forwardly projecting end of said pin, said guiding extension being attached to said barrel by means of a skeleton construction, permitting passage of fluid from the interior of said barrel to a point beyond said guide without passing through said guide, and a movable operating member positioned forwardly of said valve core and pin in position to contact said pin to actuate said valve and permit fluid passage therethrough.

4. The construction set forth in claim 3 wherein said operating member is provided with a fluid passage having an opening adjacent the forward end of the operating extension on said center pin, said operating member being movable to and from position to contact said pin extension, means on said pin extension for closing the opening to said fluid passage when said operating member is moved to position to contact said pin extension, said operating member being movable forwardly to position out of contact with said operating extension, or into contact therewith or rearwardly to position to open said valve.

References Cited in the file of this patent

UNITED STATES PATENTS

| | | |
|---|---|---|
| 1,187,154 | Kraft et al. | June 13, 1916 |
| 1,561,367 | Spreen | Nov. 10, 1925 |
| 2,048,843 | Crowley | July 28, 1936 |
| 2,236,585 | Wahl | Apr. 1, 1941 |
| 2,443,851 | Corcoran | June 22, 1948 |
| 2,660,834 | MacGlashan | Dec. 1, 1953 |
| 2,758,608 | Sutcliffe | Aug. 14, 1956 |
| 2,862,515 | Briechle | Dec. 2, 1958 |
| 2,886,055 | Davis | May 12, 1959 |
| 2,923,318 | Monson | Feb. 2, 1960 |
| 2,949,928 | Hobson | Aug. 23, 1960 |

FOREIGN PATENTS

| | | |
|---|---|---|
| 362,573 | Italy | Aug. 30, 1938 |
| 475,736 | France | Mar. 23, 1915 |
| 651,963 | Great Britain | Apr. 11, 1951 |
| 728,273 | France | Apr. 11, 1932 |
| 1,069,397 | France | Feb. 10, 1954 |

UNITED STATES PATENT OFFICE

CERTIFICATE OF CORRECTION

Patent No. 3,104,676 September 24, 1963

Donald E. Steer

It is hereby certified that error appears in the above numbered patent requiring correction and that the said Letters Patent should read as corrected below.

Column 2, line 65, for "suporting" read -- supporting --; column 3, line 27, for "corespond" read -- correspond --; line 60, for "smug" read -- snug --; same column 3, line 63, for "empolyed" read -- employed --; column 4, line 9, for "26D" read -- 260 --; line 13, for "effiect" read -- effect --; line 23, for "stampled" read -- stamped --; same column 4, line 25, for "receiveing" read -- receiving --.

Signed and sealed this 7th day of April 1964.

(SEAL)
Attest:

ERNEST W. SWIDER

Attesting Officer

EDWARD J. BRENNER

Commissioner of Patents